(12) United States Patent
Kim et al.

(10) Patent No.: US 6,478,555 B1
(45) Date of Patent: Nov. 12, 2002

(54) APPARATUS FOR CONTROLLING NOISE AND VIBRATION FOR DRAIN PUMP

(75) Inventors: Jong Ho Kim, Changwon; Ki Chul Cho, Masan; Soung Bong Choi, Changwon, all of (KR)

(73) Assignee: LG Electronics, Inc. (KR)

(*) Notice: Subject to any disclaimer, the term of this patent is extended or adjusted under 35 U.S.C. 154(b) by 0 days.

(21) Appl. No.: 09/589,494

(22) Filed: Jun. 7, 2000

(30) Foreign Application Priority Data

Jun. 16, 1999 (KR) .............................. 99/22516
Jun. 16, 1999 (KR) .............................. 99/22517
Jan. 12, 2000 (KR) .............................. 00/1322

(51) Int. Cl.$^7$ .................................. F04B 17/03
(52) U.S. Cl. ................ 417/420; 417/423.1; 464/29; 464/74
(58) Field of Search ................. 417/420, 424.1, 417/423.3, 363, 423.1; 464/70, 73, 74, 85, 29

(56) References Cited

U.S. PATENT DOCUMENTS

| 2,300,778 | A | * | 11/1942 | Cornwell ............... 464/29 |
| 2,485,848 | A | * | 10/1949 | Sharp .................. 464/29 |
| 3,386,264 | A | * | 6/1968 | Paulsen ................ 464/74 |
| 4,750,872 | A | * | 6/1988 | Palliser ............... 417/424 |
| 4,861,240 | A | * | 8/1989 | Marioni et al. ......... 417/423.3 |
| 5,668,425 | A | * | 9/1997 | Marioni et al. ......... 464/85 |
| 6,217,452 | B1 | * | 4/2001 | Marioni ................ 464/74 |
| 6,265,799 | B1 | * | 7/2001 | Uriarte ................ 417/363 |

FOREIGN PATENT DOCUMENTS

| DE | 4024194 | 7/1990 |
| EP | 207430 | 6/1986 |
| EP | 487785 | 11/1990 |
| EP | 514272 | 5/1992 |
| EP | 723329 | 1/1996 |

\* cited by examiner

*Primary Examiner*—Michael Koczo
(74) *Attorney, Agent, or Firm*—Ostrolenk, Faber, Gerb & Soffen, LLP

(57) ABSTRACT

An apparatus for reducing a noise and a vibration of a drain pump, including: a rotor rotated by a mutual interaction with a stator; a rotational shaft rotated by being directly combined to the rotor; a coupling cylinder combined to an end portion of the rotational shaft; a coupling tap protrusively formed on an outer circumferential portion of the coupling cylinder; an impeller including a receiving portion in which the coupling cylinder is received and being rotated by receiving a rotation force from the rotational shaft; an impeller tap protrusively formed on an inner circumferential portion of the receiving portion in the impeller and positioned at a predetermined part of a rotation trajectory of the coupling tap so as to contact with the coupling tap; and a buffer member of a ring shape with a gap therein located on a rotational path of the coupling tap to move along with the coupling tap in order to buffer between the coupling tap and the impeller tap when the two taps contact to each other. The two taps contact to each other in a circumferential direction of the coupling cylinder to transmit the rotational force, and the buffer member is disposed between the impeller tap and the coupling tap to alleviate the impact generated in coupling. Therefore, the parts can be prevented from breaking down, the noise and the vibration can be minimized in coupling, and the pumping performance can be highly improved. Other embodiments employ repellent magnetic members for buffering the rotational contact.

22 Claims, 15 Drawing Sheets

APPARATUS FOR CONTROLLING NOISE AND VIBRATION FOR DRAIN PUMP

BACKGROUND OF THE INVENTION

1. Field of the Invention

The present invention relates to a drain pump of a forced drain type automatic washing machine, and more particularly, to an apparatus for reducing noise and vibration of a drain pump which is capable of reducing noise and vibration that are generated in the initial driving of the drain pump.

2. Description of the Background Art

In order to wash dirty clothes, they are put in a washing fluid mixed with a detergent, so that the dirt is separated from the clothes owing to a chemical action of the detergent. But only using the action of the detergent makes the washing to take a long time. Thus, a washing machine is employed to speed the washing, by which a mechanical action such as friction or vibration is applied to the clothes, to speed the separation of the dirt from the clothes.

Washing operation of the washing machine is controlled as follows.

First, a washing phase is performed in a manner that after sensing the amount of laundry of the clothes in a washing tub for judgement, the amount of wash water and the detergent, a kind of flow and an overall washing time are set. And then, the water is eddied by the forward and backward rotation of a pulsator, which causes a friction over the laundry, thereby separating the dirt from the laundry.

As the washing phase is completed, a rinsing phase is performed in a manner that the muddy water in the washing tub is discharged and fresh water is supplied to the washing tub for rinsing the laundry as pre-set by the system.

After the rinsing phase, a dehydrating stroke is performed in a manner that the water in the washing tub is discharged, and an induction motor is rotated at a predetermined high speed to water off the laundry by a centrifugal method.

As mentioned above, when the laundry in the washing tub is washed with the washing operation controlling performed, a drain pump is used to forcibly drain the water.

A general drain pump of a conventional art is shown in FIGS. 1 to 3B, of which the outer appearance is formed by a rotor chamber 11 and an impeller chamber 12 coupled to the rotor chamber 11.

The impeller chamber 12 includes an inlet 13 and an outlet 14, paths through which the water flows in and out by pumping action at its upper and side surfaces.

A magnet housing 17a is formed at one side of the rotor chamber 11, and one side of a stator 15, forming a magnetic field as power is applied thereto, and is combined to the circumferential surface of the magnet housing 17a.

The other side of the stator 15 is extended in the axial direction, and a bobbin 16 is combined on the outer surface thereof. A coil C is wound on the bobbin 16.

As shown in FIG. 2, a magnet 17 is inserted in the magnet housing 17a, and a rotational shaft 18 is axially formed integrally at the central portion of the magnet 17, and as shown in FIG. 3A, a shaft tap 18a is protrusively formed at the upper end portion of the rotational shaft 18.

An impeller 19 is combined to the shaft tap 18a. In detail, a tap receiving portion S1 is formed inside the central portion of the impeller 19 to receive the shaft tap 18a, and an impeller tap 19a is formed at one side of the tap receiving portion S1 to prevent the magnet 17 from rotary-idling by contacting with the shaft tap 18a.

Meanwhile, as shown in FIGS. 3A and 3B, in order to prevent the impeller 19 from separating from the rotational shaft 18, a circular fixing disk 20 is fixed in the inner circumferential surface of the impeller 19 as being combined to the rotational shaft 18 at the lower portion of the shaft tap 18a.

With the conventional drain pump constructed as described above, when power is applied to the stator 15 and thus a magnetic field is generated, the rotational shaft 18 integrally formed with the magnet 17 is rotated according to the mutual interaction of the stator 15 and the magnet 17.

Thus, as the rotational shaft 18 is rotated, the impeller 19 combined to the rotational shaft 18 is accordingly rotated, thereby performing the pumping action for draining.

In this respect, the initial driving of the pump needs to generate a torque strong enough to overcome the magnetic force for performing the pumping action, because the stator 15 made of magnetic material and the magnet 17 are attracted to each other due to the magnetic force just before the initial driving of the pump.

The initial driving of the pump will now be described in detail. As shown in FIG. 3B, the initial driving of the pump is controlled as the shaft tap 18a protrusively formed at the upper end portion of the rotational shaft 18 that is integrally formed to the magnet 17 contacts with the impeller tap 19a formed in the tap receiving portion S1 so as to be coupled to the shaft tap 18a.

That is, at the same time when power is supplied, only the rotational shaft 18 is idly rotated at maximum 270° depending on relative instantaneous positions of the shaft tap 18a and the impeller tap 19a, and when the shaft tap 18a and the impeller tap 19a contact with each other, the rotational shaft 18 and the impeller 19 are integrally rotated, thereby performing the pumping action.

In this respect, in order to prevent a noise generated when the impeller tap 19a and the shaft tap 18a contact with each other, a grease is inserted into the tap receiving portion S1, by which the tap receiving portion S1 is sealed with O-ring 21.

However, the conventional drain pump as described above has disadvantages in that since the tap is not able to be directly formed on the rotational shaft, an additional means is necessary to insert the shaft tap and the O-ring, for which a process and an equipment are additionally required to forcibly fix the shaft tap and the O-ring to the rotational shaft.

Also, since the shaft tap may be easily broken when it contacts with the impeller tap, the tap is to be made by brass material, causing a difficulty in process for fabricating the tap formation and increase in expense.

Moreover, in case that hot water is pumped by the drain pump, since the impeller makes a heat distortion, the impeller tap is deformed, resulting in that it is not coupled to the shaft tap properly.

Most of all, even though the shaft tap and the impeller tap are sealed by the O-ring to prevent a noise caused when they contact with each other, coupling noise and vibration are still generated, causing users inconvenience.

SUMMARY OF THE INVENTION

Therefore, an object of the present invention is to provide an apparatus for reducing noise and vibration of a drain pump in which a buffer is provided to buffer an impact caused when an impeller tap and a coupling tap are coupled each other, so that parts can be prevented from breaking down in the initial driving of a drain pump, noise and vibration can be minimized, and a pumping performance can be improved.

Another object of the present invention is to provide an apparatus for reducing noise and vibration of a drain pump in which a magnetic material is combined to a magnet, thereby simplifying the form of the coupling portion of a rotational shaft and an impeller.

To achieve these and other advantages and in accordance with the purposed of the present invention, as embodied and broadly described herein, there is provided an apparatus for reducing noise and vibration of a drain pump including: a rotor rotated by a mutual interaction with a stator; a rotational shaft rotated by being directly combined to the rotor; a coupling cylinder combined to an end portion of the rotational shaft; a coupling tap protrusively formed on an outer circumferential portion of the coupling cylinder; an impeller including a receiving portion in which the coupling cylinder is received and rotated by receiving a rotation force from the rotational shaft; an impeller tap protrusively formed on an inner circumferential portion of the receiving portion in the impeller and positioned at a predetermined part of a rotation trajectory of the coupling tap to contact with the coupling tap; and a buffer member of a ring shape with a gap therein located on a rotational path of the coupling tap to move along with the coupling tap in order to buffer between the coupling tap and the impeller tap when the two taps contact to each other.

In order to achieve the above object, there is also provided an apparatus for reducing noise and vibration of a drain pump including: a rotational shaft of a driving source; an impeller rotated by receiving a rotation force from the rotational shaft; a coupling tap and an impeller tap formed on the rotational shaft and on the impeller, respectively, for transmitting the rotation force by contacting and coupling to each other after the rotational shaft idly rotates through a predetermined angle; and a buffering magnetic means for absorbing, by a mutually repulsive force, shock generated when the coupling tap and the impeller tap contact to each other using a repulsive force.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention may include a plurality of embodiments, of which most preferred embodiments are described herewith. Through the preferred embodiments, the objects, features and advantages of the present invention will be enough understood.

The preferred embodiments of the apparatus for reducing noise and vibration of a drain pump will now be described with reference to the accompanying drawings.

Figure 1:
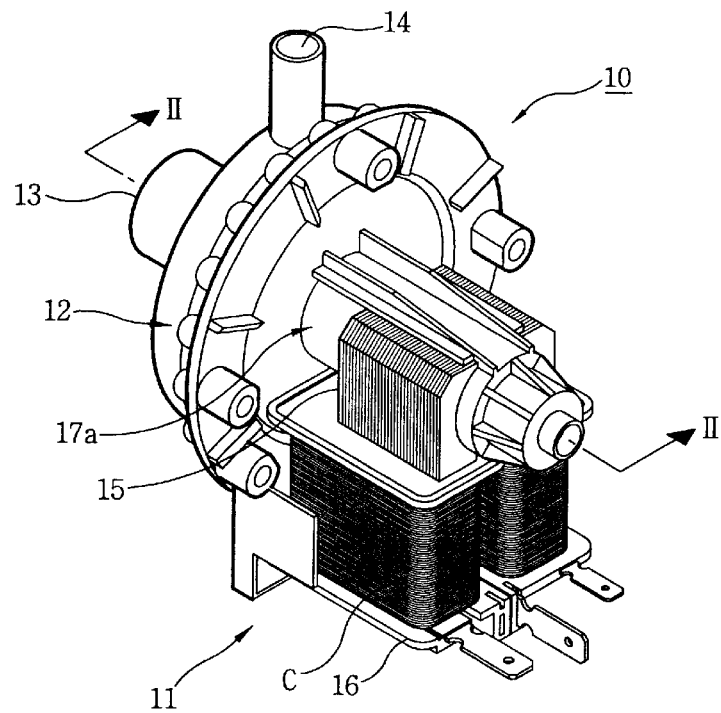
FIG. 1 is a perspective view of a general drain pump in accordance with a conventional art.
Figure 2:
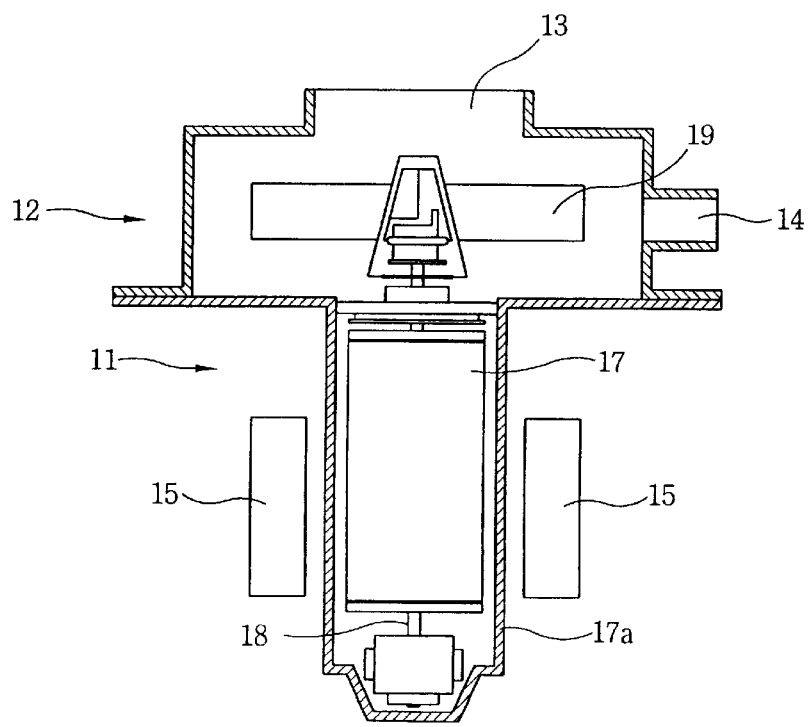
FIG. 2 is a sectional view of the drain pump taken along line II—II of FIG. 1 in accordance with the conventional art.
Figure 3A:
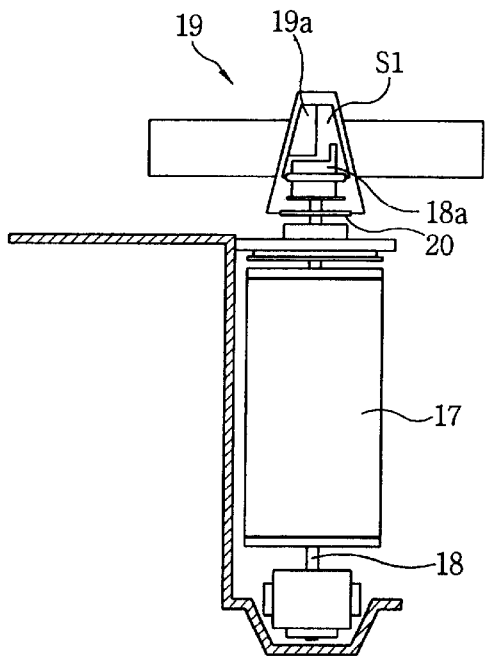
FIG. 3A is sectional view showing a engaged state of an impeller tap and a rotational coupling tap of the drain pump in accordance with the conventional art.
Figure 3B:
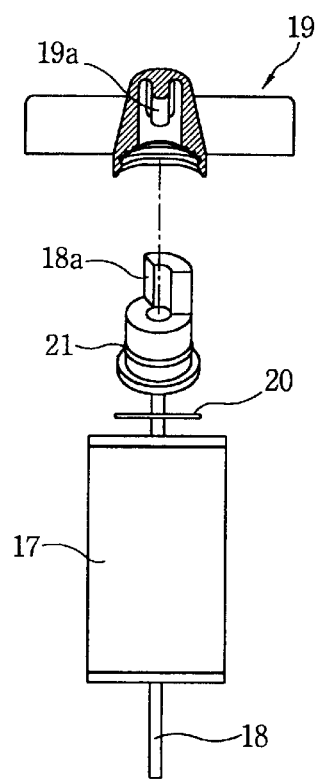
FIG. 3B is a perspective view showing a disassembled state of the impeller tap and the rotational coupling tap of FIG. 3A in accordance with the conventional art.
Figure 4:
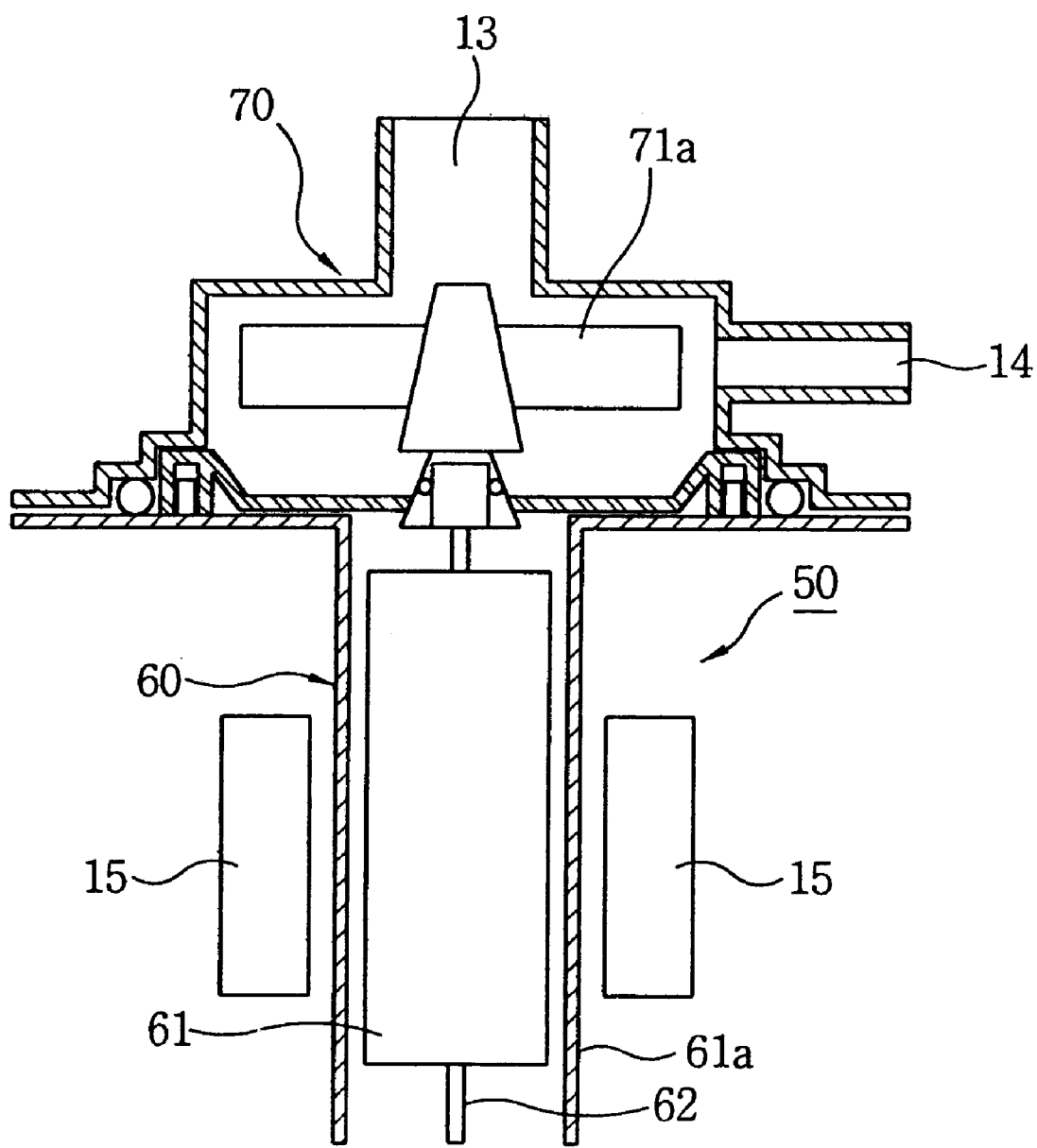
FIG. 4 is a sectional view showing a construction of an apparatus for reducing a noise and a vibration of the drain pump in accordance with a first embodiment of the present invention.

As for the drawings, the same reference numerals are given for the constructive elements as in FIGS. 1 and 2, of which the same explanations are omitted.

As shown in FIGS. 4 through 8, as for an apparatus for reducing a noise and a vibration for a drain pump in accordance with the first embodiment of the present invention, the outer form of a casing 50 of an apparatus for reducing a noise and a vibration of a drain pump is formed by a rotor chamber 60 and an impeller chamber 70 combined to the rotor chamber 60.

The impeller chamber 70 includes an Inlet 13 and an outlet 14 through which water flows in and out by pumping action, at its upper and side portions.

A magnet housing 61a is formed at one side of the rotor chamber 60, and one end portion of a stator 15 forming a magnetic field as power is supplied thereto is combined onto the outer circumferential surface of the magnet housing 61a.

A magnet 61 is inserted in the magnet housing 61a, and a rotational shaft 62 is integrally and penetratingly formed at the central portion of the magnet 61 in the axial direction.

The magnet 61 and the rotational shaft 62 form a rotor.

Figure 5:
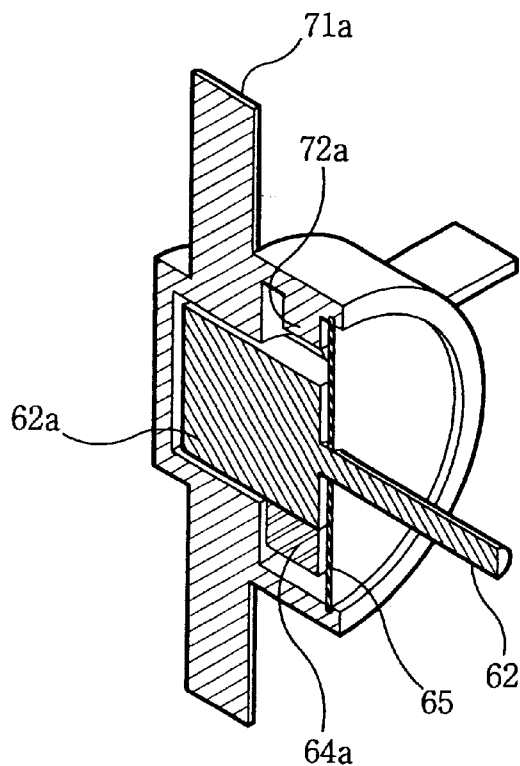
FIG. 5 is a cut-away perspective view of an impeller chamber in accordance with the first embodiment of the present invention.
Figure 6:
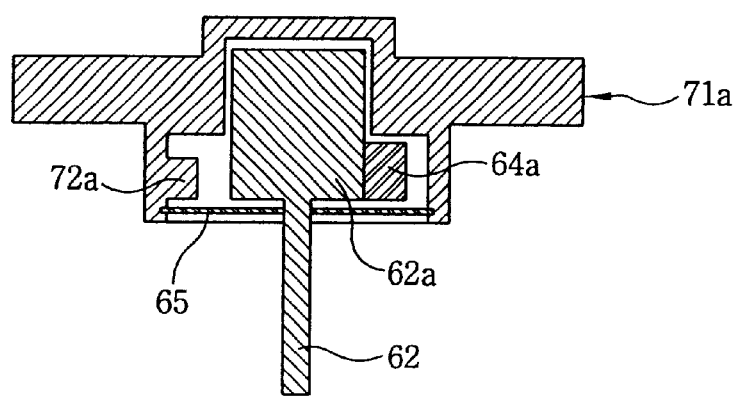
FIG. 6 is a partial enlarged sectional view of the impeller chamber in accordance with the first embodiment of the present invention.

As shown in FIGS. 5 and 6, a coupling cylinder 62a is engaged at the upper end of the rotational shaft 62, and a coupling tap 64a is formed at one side of the coupling cylinder 62a.

Figure 7:
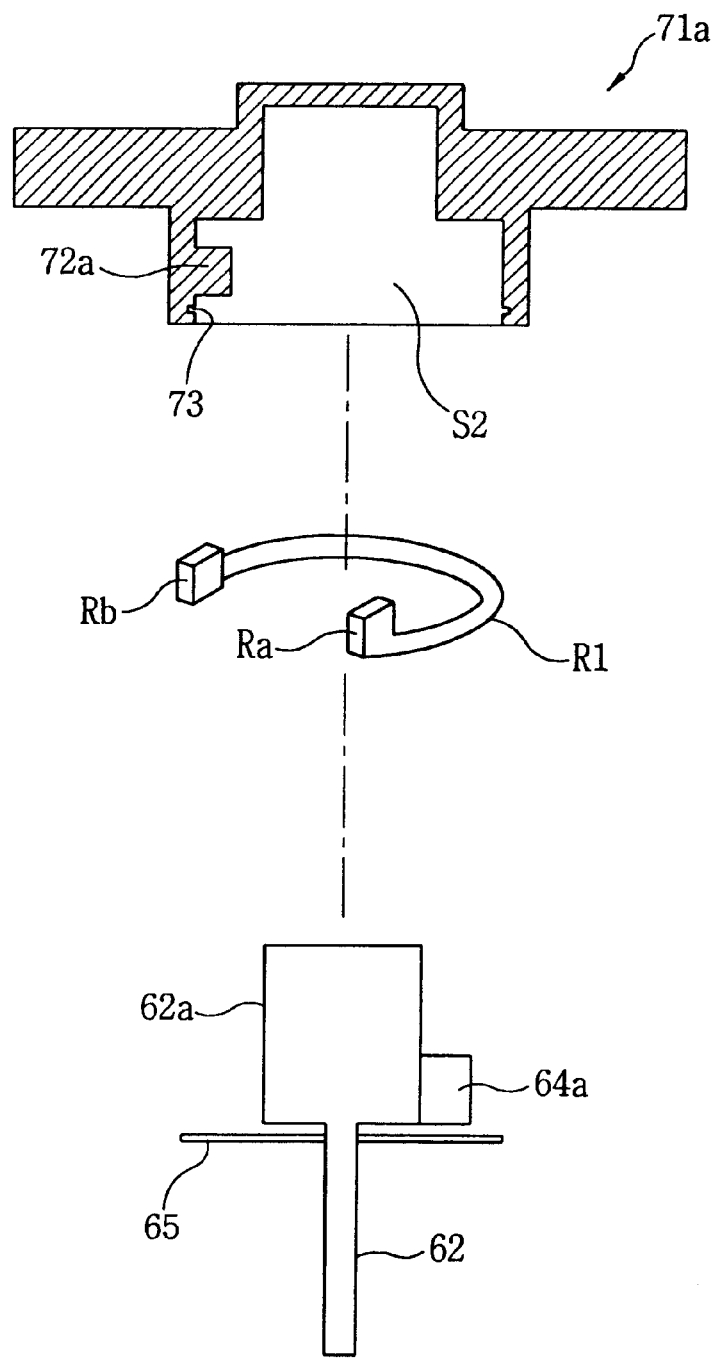
FIG. 7 is a disassembled perspective view of FIG. 6 in accordance with the first embodiment of the present invention.

As shown in FIG. 7, the impeller 71a, where the rotational shaft 62 is inserted, includes a tap receiving portion S2 for receiving the coupling cylinder 62a, and an impeller tap 72a is formed at one inner side of the impeller 71a constructing the tap receiving portion S2, so as to restrain a rotational idling of the magnet 61 as the impeller tap 72a contacts with the coupling tap 64a.

In the first embodiment of the present invention, in order to prevent a noise and a vibration generated when the coupling tap 64a and the impeller tap 72a contact with each other, a ring-shaped buffer member R1 with a predetermined gap opened therein is positioned between the coupling tap 64a and the impeller tap 72a, to serve as a buffer. The buffer member R1 has enlarged portions Ra and Rb on both ends thereof so as to be hooked by the coupling tap 64a.

Meanwhile, in order to prevent the impeller 71a from separating from the rotational shaft 62, a circular fixing disk 65 is fixed at the lower portion of the coupling cylinder 62a as being combined to the rotational shaft 62.

As shown in FIG. 7, a fixing groove 73 is formed at a lower side of the inner circumferential surface of the impeller 71a forming the tap receiving portion S2, so that the circular fixing disk 65 is firmly fixed when the coupling cylinder 62a is inserted in the tap receiving portion S2 of the impeller 71a.

The construction of the apparatus for reducing a noise and a vibration of a drain pump in accordance with the first embodiment of the present invention will now be described in detail.

With reference to FIG. 7, the tap receiving portion S2 in a convex hollow shape in its sectional view is formed inside the impeller 71a, and the impeller tap 72a is formed protrusive inwardly at one side of the tap receiving portion S2. And, the fixing groove 73 is formed at one side of the tap receiving portion S2 positioned at the lower portion of the impeller tap 72a, to which the circular fixing disk 65 is insertedly fixed.

A coupling tap 64a integrally formed with the coupling cylinder 62a is formed at one side of the outer circumferential surface of the coupling cylinder 62a that is inserted to the tap receiving portion S2 of the impeller 71a, so as to be coupled to the impeller tap 72a, and the circular fixing disk 65 is combined to the rotational shaft 62 positioned at the lower portion of the coupling tap 64a.

Figure 8A:
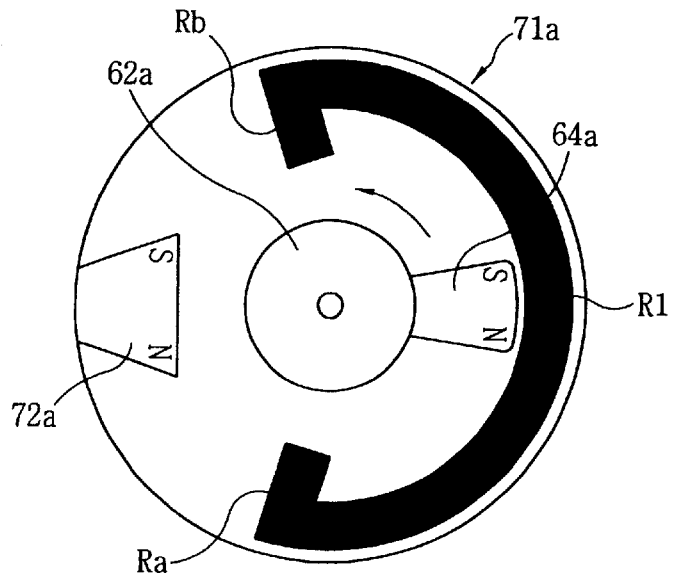
FIG. 8A is a cross-sectional view showing that only a coupling cylinder is idly rotated while the impeller is not rotated in accordance with the first embodiment of the present invention.

With reference to FIG. 8A, the thusly formed coupling cylinder 62a is inserted to the impeller 71a in a manner that after the buffer member R1 is inserted to be positioned between the impeller tap 72a and the coupling tap 64a, the coupling cylinder 62a is inserted into the tap receiving portion S2 of the impeller 71a.

The buffer member R1 is formed of a rubber material so as to alleviate the impact generated when the coupling tap 64a and the impeller tap 72a contact with each other, of which both ends are formed to be higher than the central portion thereof.

The impeller tap 72a is positioned at a predetermined portion of the rotation trajectory of the coupling tap 64a, so that when the coupling tap 64a is rotated to contact with the impeller tap 72a, both ends of the buffer member R1 contact with the coupling tap 64a to be moved, according to which the impeller tap 72a and the coupling tap 64a do not directly contact with each other.

The operation of the apparatus for reducing a noise and a vibration of a drain pump in accordance with the first embodiment of the present invention constructed as described above will now be explained.

When power is applied to the motor, a magnetic field is generated around the stator 15, and then, the rotational shaft 62 is idly rotated by the mutual interaction of the stator 15 and the magnet 61. Thereafter, according to the rotation of the rotational shaft 62, the coupling cylinder 62a formed at the upper end of the rotational shaft 62 and the impeller 71a are coupled to be rotated, thereby performing pumping action.

In detail, as shown in FIG. 8A, in the initial driving of the drain pump, the rotational shaft 62 and the magnet 61 are integrally idly rotated, that is, only the rotor is idly rotated, and according to the idle rotating, the coupling tap 64a formed at one side of the coupling cylinder 62a approaches the impeller tap 72a.

At this time, according to the rotation of the rotor, the coupling tap 64a first contacts with the end portion of the buffer member R1 and then keeps rotating, so that the coupling tap 64a and the impeller tap 72a indirectly contact with each other, having the buffer member R1 therebetween.

Figure 8B:
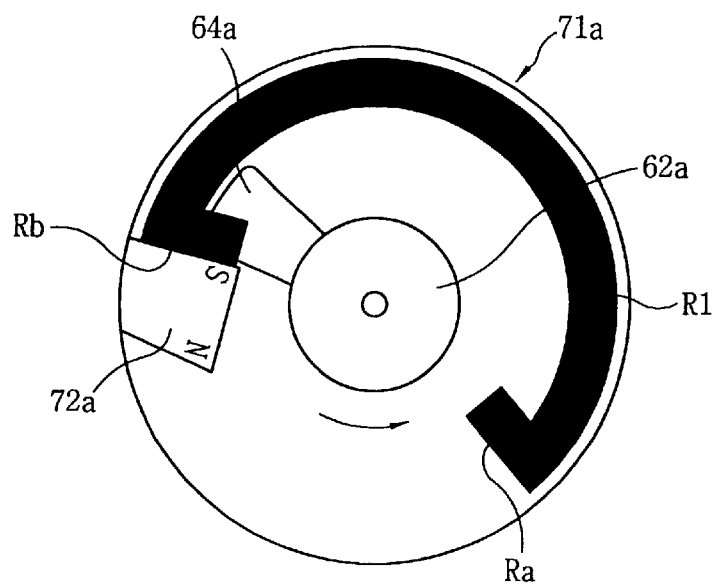
FIG. 8B is a cross-sectional view showing that a coupling tap and an impeller tap are integrally rotated with a buffer member inserted between the coupling tap and the impeller tap in accordance with the first embodiment of the present invention.

Thereafter, as shown in FIG. 8B, in a state that the buffer member R1 is inserted between the impeller tap 72a and the coupling tap 64a, the three elements are rotated altogether.

Accordingly, when the rotor is coupled to the impeller 71a, since the impeller tap 72a and the coupling tap 64a do not directly contact with each other, noise and vibration are remarkably reduced down.

An apparatus for reducing noise and vibration of a drain pump in accordance with a second embodiment of the present invention will now be described, of which the same contents as in the first embodiment is omitted.

Figure 9:
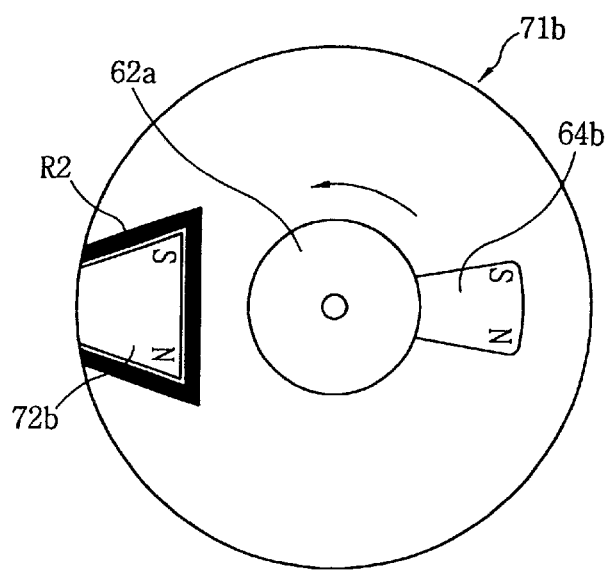
FIG. 9 is a cross-sectional view of an apparatus for reducing a noise and a vibration for a drain pump in accordance with a second embodiment of the present invention.
Figure 10:
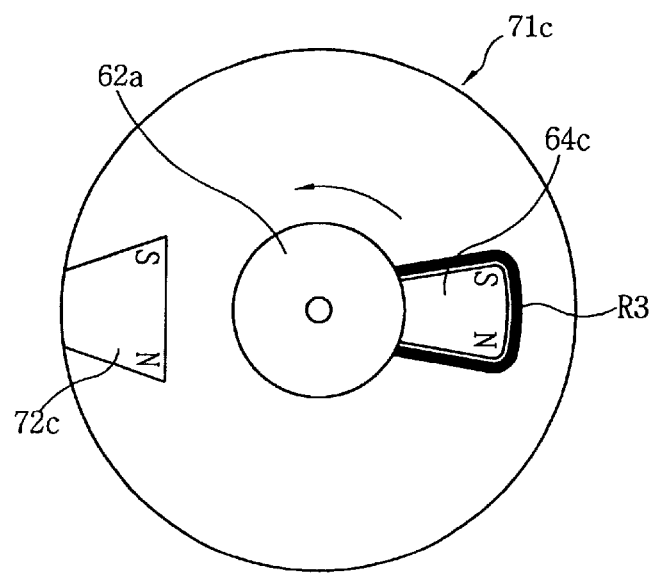
FIG. 10 is a cross-sectional view of an apparatus for reducing a noise and a vibration for a drain pump in accordance with a third embodiment of the present invention.

In the second embodiment of the present invention, as shown in FIG. 9, a buffer member R2 is featured in that it is fixed covering the overall outer surface of the impeller tap 72b.

Accordingly, the coupling tap 64b and the impeller tap 72b are integrally rotated for which the impact is alleviated by the buffer member R2 just before the coupling tap 64b is rotated to be coupled to the impeller tap 72b, so that coupling tap 64b and the impeller tap 72b do not directly contact with each other when the rotor is coupled to the impeller 71b, and thus, its noise and vibration are remarkably reduced.

An apparatus for reducing noise and vibration of a drain pump in accordance with a third embodiment of the present invention will now be described, of which the same contents as in the first embodiment is omitted.

A buffer member R3 used for the third embodiment of the present invention is featured in that it fixedly covers the overall outer surface of the coupling tap 64c.

Accordingly, the coupling tap 64c and the impeller tap 72c are integrally rotated for which the impact is alleviated by the buffer member R3 just before the coupling tap 64c is rotated to be coupled to the impeller tap 72c, so that the coupling tap 64c and the impeller tap 72c do not directly contact with each other when the rotor is coupled to the impeller 71c, and thus its noise and vibration are remarkably reduced.

An apparatus for reducing a noise and a vibration of a drain pump in accordance with a fourth embodiment of the present invention will now be described, of which the same contents as in the first embodiment is omitted.

Figure 11A:
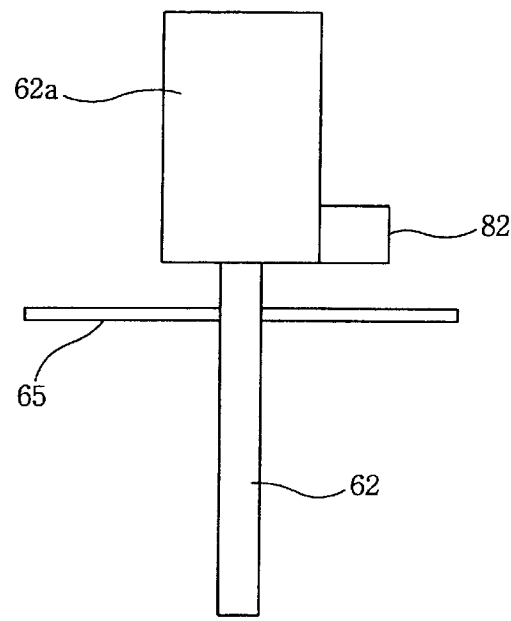
FIG. 11A is a sectional view of a coupling cylinder in accordance with a fourth embodiment of the present invention.
Figure 12A:
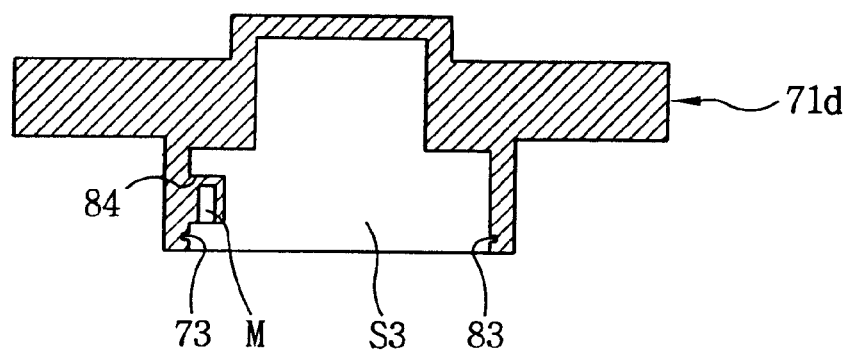
FIG. 12A is a sectional view of an impeller in accordance with the fourth embodiment of the present invention.

As shown in FIGS. 11A and 12A, a first magnet pocket 82 in which a first magnetic material M1 is insertedly fixed is formed at one side of the outer circumferential surface of the coupling cylinder 62a that is inserted to a tap receiving portion S3 of an impeller 71d, and a circular fixing disk 65 is combined to the rotational shaft 62 positioned at the lower portion of the first magnet pocket 82.

At one side of the tap receiving portion S3 of the impeller 71d and at a predetermined portion of the rotational trajectory of the first magnet pocket, the second magnet pocket 84 is formed protrusive in the inward direction to which a second magnetic material M2 is insertedly fixed, facing the same pole as that of the first magnet pocket 82 so as to generate a repulsive force therebetween, and the fixing groove 73 is formed at the lower portion of the second magnet pocket 84, at one side of the tap receiving portion S3, to which the circular fixing disk 65 is insertedly fixed.

Figure 11B:
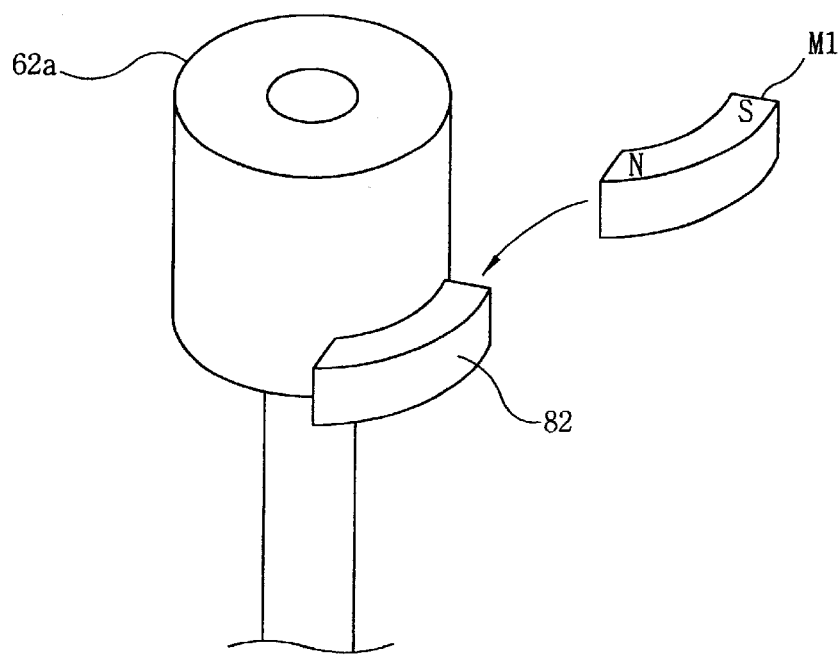
FIG. 11B is a perspective view showing a form of a first magnet pocket and a magnetic material inserted thereto in accordance with the fourth embodiment of the present invention.
Figure 12B:
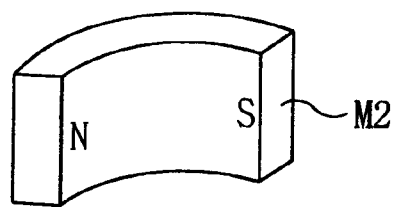
FIG. 12B is a perspective view of a magnetic material inserted to a second magnet pocket in accordance with the fourth embodiment of the present invention.

As shown in FIGS. 11B and 12B, the first magnetic material M1 and the second magnetic material M2 are formed to be round in a fan shape, similarly to the outer form of the first magnet pocket 81 and the second magnet pocket 84.

Figure 13:
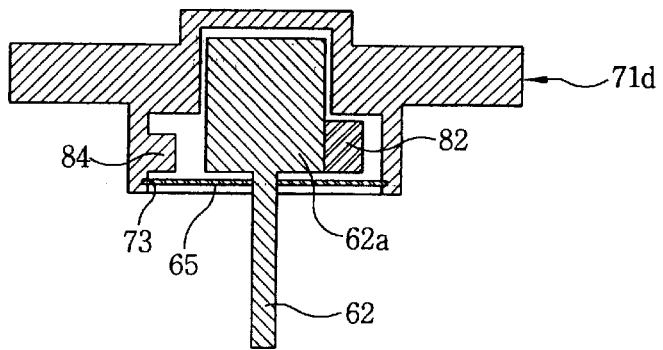
FIG. 13 is a sectional view showing a combined state of an impeller and a coupling cylinder in accordance with the fourth embodiment of the present invention.

FIG. 13 is a sectional view showing a combined state of an impeller and a coupling cylinder in accordance with the fourth embodiment of the present invention, in which, notably, the circular fixing disk 65 is inserted in the fixing groove 73 so that the impeller 71d and the coupling cylinder 62a are not separated.

The operation of the apparatus for reducing noise and vibration of a drain pump in accordance with the fourth embodiment of the present invention constructed as described above will now be explained.

When power is applied to a motor, a magnetic field is generated around the stator 15 and the rotational axis 62 is idly rotated by a mutual interaction of the stator 15 and the magnet 61. According to the rotation of the rotational shaft 62, the coupling cylinder 62a formed at the upper end of the rotational shaft 62 and the impeller 71d are coupled to be rotated, thereby performing pumping action.

Figure 14A:
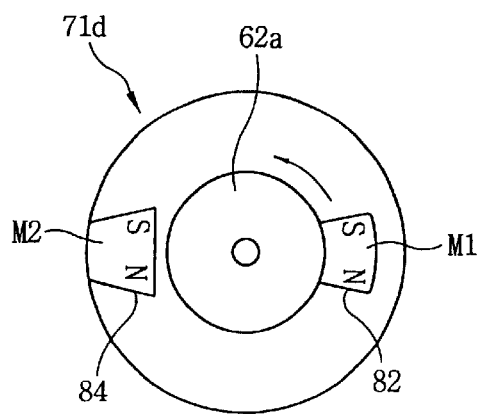
FIG. 14A is a cross-sectional view showing that only the coupling cylinder is idly rotated while the impeller is not rotated in accordance with the fourth embodiment of the present invention.

In detail, as shown in FIG. 14A, in the initial driving of the motor, the rotational shaft 62 and the magnet 61, that is, the rotor, are integrally idly rotated, according to which the first magnet pocket 82 formed at one side of the coupling cylinder 62a approaches the second magnet pocket 84.

In this respect, in the fourth embodiment of the present invention, the magnetic materials M1 and M2 respectively inserted in the first magnet pocket 82 and the second magnet pocket 84 are disposed to face the same poles toward each other, so a repulsive force is generated between the magnetic materials M1 and M2.

Figure 14B:
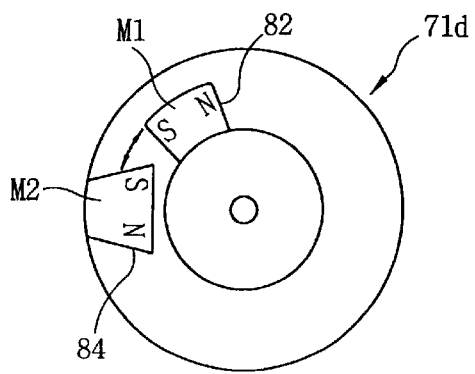
FIG. 14B is a cross-sectional view showing that the first magnet pocket and the second magnet pocket are integrally rotated as being coupled each other in accordance with the fourth embodiment of the present invention.

Accordingly, as shown in FIG. 14B, the impeller 71d and the coupling cylinder 62a are integrally rotated as being coupled while the first and the second magnet pockets 82 and 84 maintain a predetermined distance as long as a distance proportionate to the repulsive force between the magnetic materials M1 and M2, without contacting with each other.

That is, since the first and the second magnet pockets 82 and 84 couple the impeller 71d and the rotational shaft 62, while constantly maintaining more than a predetermined distance without contacting with each other, a coupling noise and a vibration are remarkably reduced.

An apparatus for reducing noise and vibration of a drain pump in accordance with a fifth embodiment of the present invention will now be described, of which the same contents as in the first embodiment is omitted.

Figure 15:
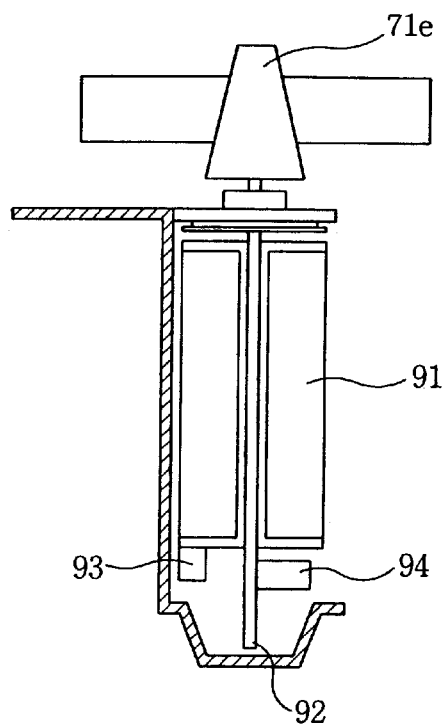
FIG. 15 is a sectional view of an apparatus for reducing a noise and a vibration of a drain pump in accordance with a fifth embodiment of the present invention.
Figure 16A:
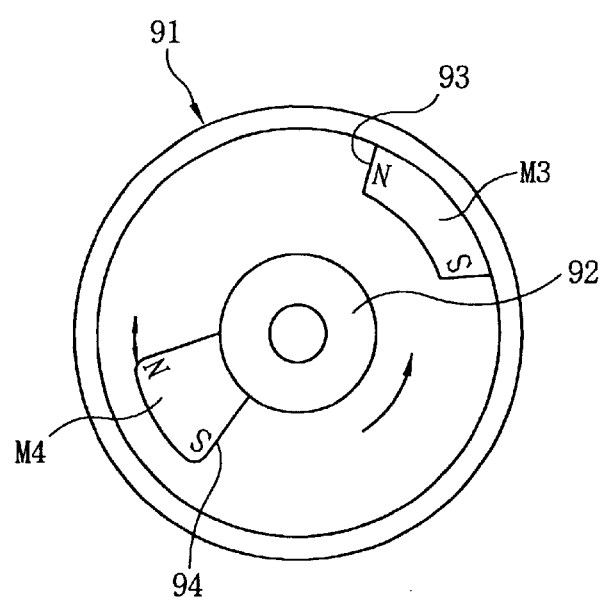
FIG. 16A is a cross-sectional view showing that only a magnet is idly rotated while a rotational shaft is not rotated in accordance with the fifth embodiment of the present invention.
Figure 16B:
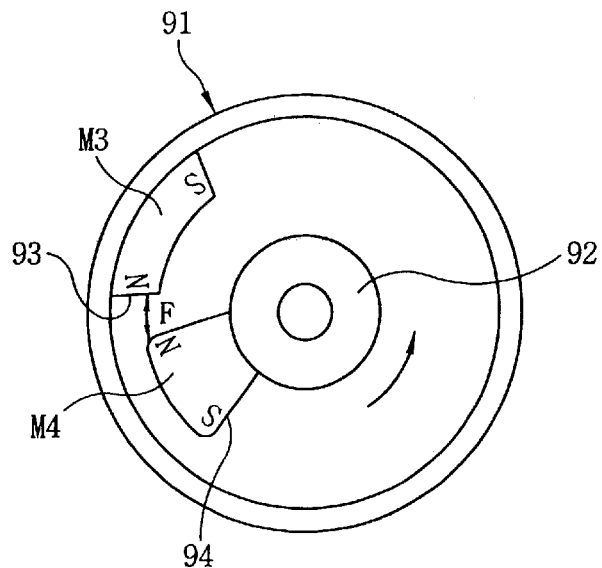
FIG. 16B is a cross-sectional view showing that a first magnet pocket and a second magnet pocket are integrally rotated as being coupled each other in accordance with the fifth embodiment of the present invention.

As shown in FIGS. 15 through 16B, the fifth embodiment of the present invention is featured in that an impeller 71e and a rotational shaft 92 are either combined to each other or integrally formed.

And, a first magnet pocket 93 having a first magnetic material M3 and a second magnet pocket 94 having a second magnetic material M4 are respectively combined to a magnet 91 and a rotational shaft 92.

In detail, the first magnet pocket 93 is combined to the lower end portion of the magnet 91 and the second magnet pocket 94 is combined to the outer circumferential surface of the rotational shaft 92 so as to be positioned at a predetermined portion of the rotation trajectory of the first magnet pocket 93.

The first and the second magnetic materials M3 and M4 are formed to be rounded in a fan shape, similar to the contour of the first and the second magnet pockets 93 and 94, and positioned to face the same poles toward each other so as to generate a repulsive force.

The operation of the fifth embodiment of the present invention will now be described.

When power is applied to the motor, a magnetic field is generated in the stator 15, and the magnet 91 is idly rotated according to the mutual interaction of the stator 15 and the magnet 91. According to the rotation of the magnet 91, the magnet 61 and the impeller 71e are coupled so that the impeller 71e combined to the rotational shaft 92 is rotated, thereby performing a pumping action.

In detail, as shown in FIG. 16A, in the initial driving of the motor, the magnet 91 is idly rotated alone, according to which the first magnet pocket 93 combined to the magnet 91 approaches the second magnet pocket 94 combined to the rotational shaft 92.

In this respect, in the fifth embodiment of the present invention, the magnetic materials M3 and M4 respectively inserted in the first magnet pocket 93 and the second magnet pocket 94 are disposed to face the same poles toward each other, so a repulsive force is generated between the magnetic materials M1 and M2.

Accordingly, as shown in FIG. 16B, the first and the second magnet pockets 93 and 94 couple the magnet 91 and the impeller 71e while maintaining a predetermined distance as long as a distance proportionate to the repulsive force between the magnetic materials M3 and M4 without contacting with each other, according to which the magnet 91 and the impeller 71e are integrally rotated.

That is, since the first and the second magnet pockets 93 and 94 couple the magnet 91 and the impeller 71e, while constantly maintaining more than a predetermined distance without contacting with each other, a coupling noise and a vibration are remarkably reduced.

An apparatus for reducing noise and vibration of a drain pump in accordance with a sixth embodiment of the present invention will now be described, of which the same contents as in the first embodiment is omitted.

Figure 17:
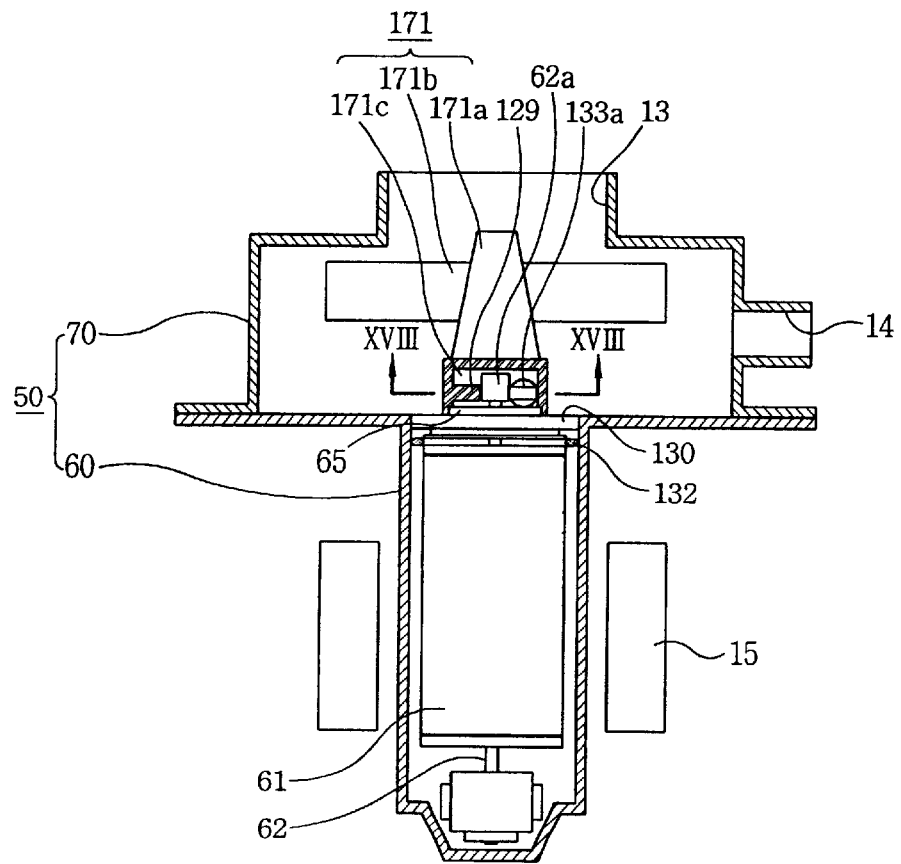
FIG. 17 is a sectional view of a drain pump in accordance with a sixth embodiment of the present invention.

As shown in FIG. 17, in the sixth embodiment of the present invention, a coupling tap 62a is protrusively formed in a radial direction at a coupling cylinder 62a combined at the upper end of the rotational shaft 62 along the axial direction of the rotational shaft 62, and an impeller 171 is provided in an impeller chamber 70 including a tap receiving portion 171c to receive a coupling cylinder 62a.

And, an impeller tap 129, mutually interacting with the coupling cylinder 62a, is protrusively formed from the inner wall of the tap receiving portion 171c, to have a predetermined length toward the inner center.

A first elastic deformation member 133a and a second elastic deformation member 133b are positioned to be elastically deformable between the impeller tap 129 and the coupling cylinder 62a in the tap receiving portion 171c.

Figure 18:
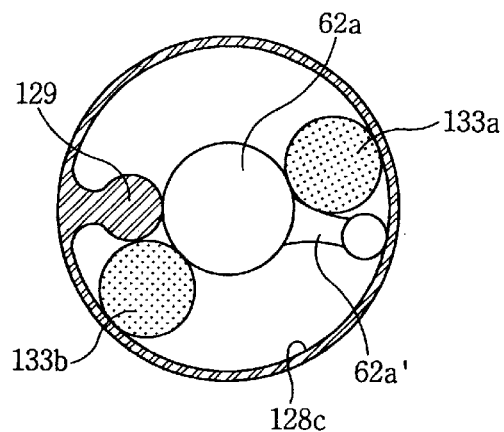
FIG. 18 is an enlarged sectional view of the drain pump taking along line XVIII—XVIII of FIG. 17 in accordance with the sixth embodiment of the present invention.
Figure 19A:
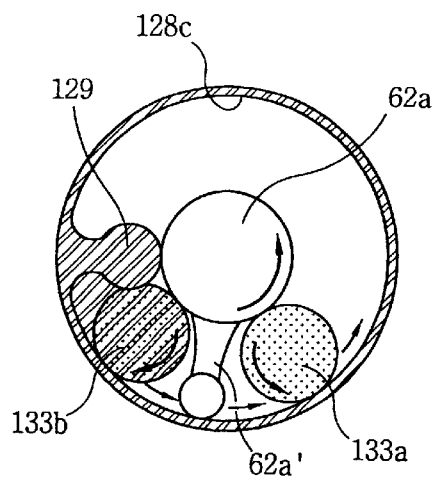
FIGS. 19A through 19D are sectional views for explanation of a working of an elastic deformation member of FIG. 18 in accordance with the sixth embodiment of the present invention.
Figure 19B:
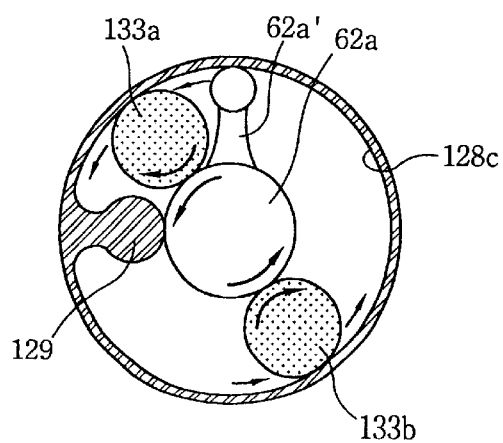
Figure 19C:
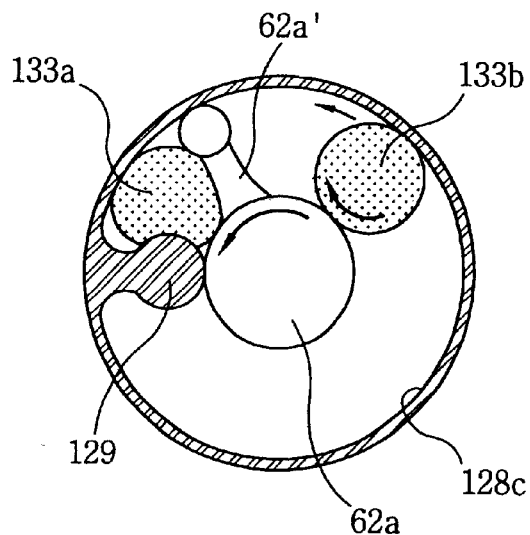
Figure 19D:
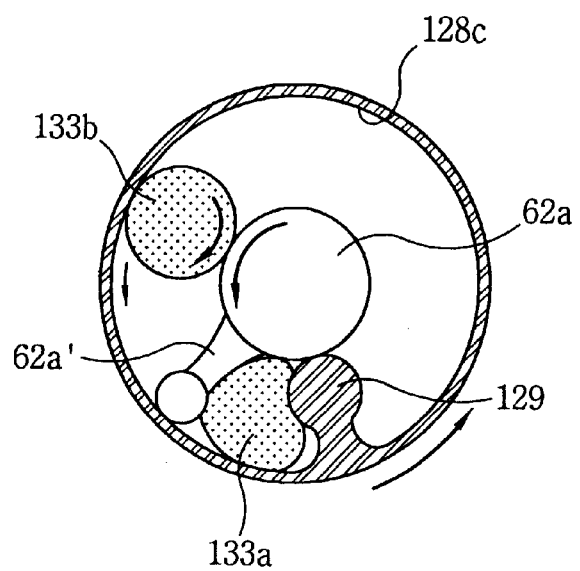

As shown in FIGS. 18 through 19D, the first and the second elastic deformation members 133a and 133b are respectively formed in a bulb shape in the tap receiving portion 171c. The first and the second elastic deformation members are inserted between the impeller tap 129 and the coupling cylinder 62a in a manner of being elastically deformable, so that it transmits the turning force of the coupling cylinder 62a to the impeller tap 129.

A blocking member 130 is combined at the upper portion of the rotor chamber 60 to block the rotor chamber 60 over the impeller chamber 70, and an O-ring 132 is combined to the lower side of the blocking member 130 to maintain air tight.

For more detailed explanation on the structure of the impeller 171, the impeller 171 includes a hub 171a, a plurality of blades 171b separately disposed radially around the hub 171a, and the tap receiving portion 171c formed at one side of the hub 171a, extending along the axial direction and receiving the coupling cylinder 62a therein.

At the opening of the tap receiving portion 171c, a circular fixing disk 65 is combined by press-fit method at one side of the coupling cylinder 62a along the axial direction of the rotational shaft 62, so as to prevent the impeller 171 from separating from the rotational shaft 62.

The first and the second elastic deformation members 133a and 133b are formed to preferably have a diameter as wide as to frictionally contact between the coupling cylinder 62a and the inner diameter surface of the tap receiving portion 171c.

Nevertheless, in other embodiments of the present invention, the first and the second elastic deformation members may have a circular disk form or a cylinder form to make rolling contact with the inner diameter surface of the tap receiving portion 171c and at the same time to slidably contact with the circular fixing disk 65, and may have a cylinder form or bulb form with a cavity inside thereof.

The operation of the sixth embodiment of the present invention will now be described.

When power is applied to the stator 15, the magnet 61 is one-way rotated integrally with the rotational shaft 62.

At this time, as shown in FIG. 19A, the impeller tap 129 is fixed, and the coupling cylinder 62a is rotated together with the rotational shaft 62.

As the coupling cylinder 62a is rotated, the first elastic deformation member 133a disposed in the front side over the rotation direction of the coupling cylinder 62a contacts with the coupling cylinder 62a so as to be rotated, and at the same time, revolves along the inner diameter surface of the tap receiving portion 171c toward the impeller tap 129.

At this time, as shown in FIG. 19B, the second elastic deformation member 133b disposed at the rear side over the movement direction of the coupling cylinder 62a frictionally contacts with the coupling cylinder 62a and revolves in the opposite direction of the first elastic deformation member 133a, so that it revolves in the same direction of the first elastic deformation member 133a along the inner diameter surface of the tap receiving [unit] portion 171c.

Meanwhile, the first elastic deformation member 133a revolving in the front side of the coupling cylinder 62a is stopped as it contacts with one side of the stopped impeller tap 129, and at the same time, starts elastically deforming by the pressurization of the rotating coupling cylinder 62a as shown in FIG. 19C.

After the elastic deformation progresses for more than a predetermined time, when the elastic force of the first elastic deformation member 133a is stronger than a load of the impeller tap 129, the impeller tap 129, the first elastic deformation member 133a and the coupling cylinder 62a are integrally rotated.

Accordingly, the wash water is suctioned into the impeller chamber 70 through the inlet 13, and discharged to outside through the outlet 14.

Apparatuses for reducing noise and vibration of a drain pump in accordance with a seventh and an eighth embodiments of the present invention will now be described, of which the same contents as in the first embodiment is omitted.

Figure 20:
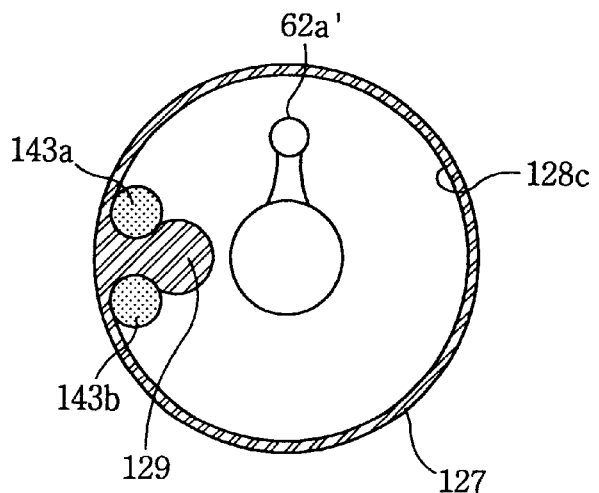
FIG. 20 is a sectional view for explanation of a working of an elastic deformation member in accordance with a seventh embodiment of the present invention.

First, as shown in FIG. 20, in the seventh embodiment of the present invention, the coupling cylinder 62a is rotatably received in the inner central region of the tap receiving portion 171c of the impeller 171, and an impeller tap 129 is formed at one side of the inner wall of the tap receiving portion 171c to be protrusive toward the coupling cylinder 62a.

At the both sides of the impeller tap 129, a pair of elastic deformation members 143a and 143b in a cylinder form or in a bulb form are fixedly combined, respectively.

Figure 21:
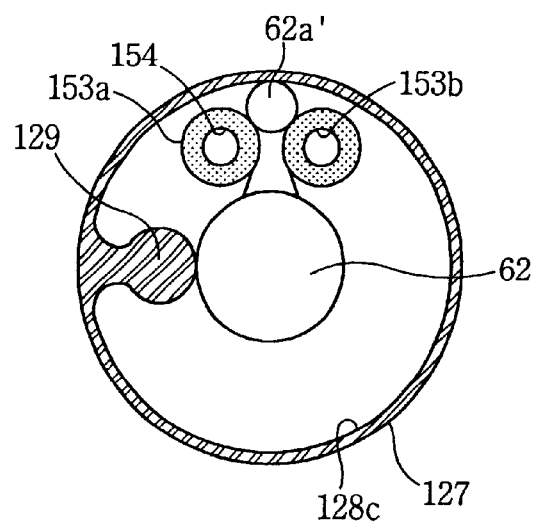
FIG. 21 is a sectional view for explanation of a working of an elastic deformation member in accordance with an eighth embodiment of the present invention.

Meanwhile, as shown in FIG. 21, the elastic deformation member is formed as two hollow members 153a and 153b having a cavity 154 inside thereof. The outer form of each elastic deformation member 153a and 153b may be one of a cylinder form or a bulb form. The elastic deformation members 153a and 153b are fixedly combined at both sides, respectively, of the coupling tap 62a that is rotatably received inside the tap receiving portion 171c of the impeller 171.

The operations of the apparatus for reducing a noise and a vibration for a drain pump in accordance with the seventh and eighth embodiments of the present invention will now be described.

When power is applied to the stator 15, the coupling cylinder 62a is rotated in one direction together with the rotational shaft 62 and elastically contacts with one of the elastic deformation members 143a, 143b, 153a and 153b that is inserted between the coupling tap 62a and the impeller tap 129.

The elastic deformation member contacting between the coupling tap 62a and the impeller tap 129 is elastically deformed by the turning force of the coupling cylinder 62a to alleviate the impact of the coupling cylinder 62a and at the same time restrain a noise from occurring.

At this time, if the elastic force of the elastic deformation member is stronger than the load taken to the impeller tap 129, the impeller tap 129 and the coupling cylinder 62a are integrally rotated, according to which the impeller 171 performs pumping action.

As so far described, according to the apparatus for reducing a noise and a vibration of the drain pump of the present invention, in order to minimize the noise and the vibration generated due to the coupling of the impeller tap and the coupling tap in the initial driving of the drain pump, the buffer member is disposed between the impeller tap and the coupling tap to alleviate the impact generated in coupling, so that the parts can be prevented from breaking down, the noise and the vibration can be minimized in coupling, and the pumping performance can be highly improved.

Also, by forming the coupling units using the magnetic material at the magnet, the formation of the coupling portion of the rotational shaft and the impeller can be simplified.

In addition, the elastic deformation member that is elastically deformable is inserted between the coupling cylinder and the impeller tap so that the coupling cylinder and the impeller tap do not directly contact with each other and are integrally rotated after the elastic deformation member is elastically deformed. Thus, a possible damage due to an impact according to the direct contact between the impeller tap and the coupling cylinder can be prevented as well as restraining the noise.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus for controlling noise and vibration of a drain pump, comprising:

a magnet rotated by a mutual interaction with a stator that forms a magnetic field when power is applied thereto;

a rotational shaft combined to the magnet;

a coupling cylinder combined to an end portion of the rotational shaft;

a first coupling member formed at one side of a circumferential portion of the coupling cylinder;

an impeller including a receiving unit to which the coupling cylinder is inserted;

a second coupling member formed at one side of an inner surface of the impeller and positioned at a predetermined portion of a rotation trajectory of the coupling member;

a buffer member positioned between the first coupling member and said second coupling member; and a circular disk insertedly combined at a portion of the rotational shaft positioned at a lower side of the coupling cylinder so that its outer circumferential end portion is combined to the inner circumferential surface of the impeller, wherein the first coupling member is associated with first magnet pocket, the second coupling member is associated with a second magnet pocket, the buffer members are associated with first and second magnetic materials respectively insertedly fixed inside the first and the second magnet pockets.

2. The apparatus according to claim 1, wherein the first magnetic material and the second magnetic material are disposed to face the opposite pole each other so as to have a repulsive force mutually.

3. An apparatus for reducing noise and vibration of a drain pump comprising:

a rotor rotated by a mutual interaction with a stator;

a rotational shaft rotated by being directly combined to the rotor;

a coupling cylinder combined to an end portion of the rotational shaft;

a coupling tap protrusively formed on an outer circumferential portion of the coupling cylinder;

an impeller including a receiving portion in which the coupling cylinder is received and rotated by receiving a rotation force from the rotational shaft;

an impeller tap protrusively formed on an inner circumferential portion of the receiving portion in the impeller and positioned at a predetermined part of a rotation trajectory of the coupling tap to contact with the coupling tap; and a buffer member of a ring shape with a gap therein located on a rotational path of the coupling tap to move along with the coupling tap in order to buffer between the coupling tap and the impeller tap when the two taps contact to each other.

4. The apparatus of claim 3, further comprising: a fixing means coupled to the receiving portion of the impeller for preventing the coupling cylinder and the rotational shaft from being separated from the impeller.

5. The apparatus of claim 4, wherein the receiving portion of the impeller has a fixing portion to which the fixing means is combined.

6. The apparatus of claim 3, wherein the buffer member has enlarged portions on both ends thereof so as to be hooked by the coupling tap.

7. The apparatus of claim 3, wherein the coupling tap and the impeller tap respectively include mutually repulsive magnetic means so as to relieve a shock generated when the two taps contact to each other.

8. An apparatus for reducing noise and vibration of a drain pump comprising:

a rotational shaft directly coupled to a rotor which is rotated by an interaction with a stator;

an impeller including a receiving portion in which a coupling cylinder is received and rotated by receiving a rotation force from the rotational shaft;

a coupling tap and an impeller tap protruded on an outer circumferential surface of the rotational shaft and on an inner circumferential surface of the impeller, respectively, for transmitting a rotation force by contacting and coupling to each other after the rotational shaft idly rotates through a predetermined angle; and a buffer member for buffering between the coupling tap and the impeller tap when the two taps contact to each other.

9. The apparatus of claim 8 further comprising a magnetic means for absorbing, by a mutually repulsive force, a shock generated when the coupling tap and the impeller tap contact to each other.

10. The apparatus of claim 8, wherein the rotational shaft is located in the receiving portion of the impeller and includes a coupling cylinder on which the coupling tap is formed.

11. The apparatus of claim 10, wherein the coupling tap is formed on an outer circumferential surface of the coupling cylinder, and the impeller tap is formed on an inner circumferential surface of the receiving portion.

12. The apparatus of claim 8, wherein the receiving portion of the impeller includes a fixing means for preventing the rotational shaft from being separated from the impeller.

13. The apparatus of claim 12, wherein the buffering means is formed as a ring with a gap, and includes enlarged portions on both ends thereof so as to be hooked by the coupling tap.

14. An apparatus for reducing noise and vibration of a drain pump comprising:

a rotational shaft of a driving source;

an impeller rotated by receiving a rotation force from the rotational shaft;

a coupling tap and an impeller tap formed on the rotational shaft and on the impeller, respectively, for transmitting the rotation force by contacting and coupling to each other after the rotational shaft idly rotates through a predetermined angle; and a buffering magnetic means for absorbing, by a mutually repulsive force, shock generated when the coupling tap and the impeller tap contact to each other using a repulsive force.

15. The apparatus of claim 14, wherein the driving source comprises a rotor including a magnet which is coupled to the rotational shaft, and a stator installed around the rotor for forming a magnetic field.

16. The apparatus of claim 14, wherein a coupling cylinder is coupled to an end of the rotational shaft, and a tap receiving portion in which the coupling cylinder is received is formed in the impeller.

17. The apparatus of claim 16, wherein the coupling tap is formed on an outer circumferential surface of the coupling cylinder, and the impeller tap is formed on an inner circumferential surface of the tap receiving portion.

18. The apparatus of claim 16, wherein a buffer member located on a circumference of the coupling cylinder is disposed in the tap receiving portion for buffering when the coupling tap and the impeller tap contact to each other by being inserted therebetween.

19. The apparatus of claim 18, wherein the buffer member is formed as a ring with a gap, and includes enlarged portions on both ends thereof.

20. The apparatus of claim 14, wherein the impeller includes a fixing means for preventing the rotational shaft from being separated from the impeller.

21. The apparatus of claim 20, wherein the coupling cylinder is coupled to an end of the rotational shaft, the tap receiving portion in which the coupling cylinder is received is formed on the impeller, and the fixing means is a circular fixing disk which is coupled in the tap receiving portion for preventing separation of the coupling cylinder.

22. The apparatus of claim 21, wherein the tap receiving portion includes a coupling recess so that an outer circumferential surface of the circular fixing disk can be inserted therein.

* * * * *